US012656250B2

(12) United States Patent
Atia et al.

(10) Patent No.: US 12,656,250 B2
(45) Date of Patent: \*Jun. 16, 2026

(54) INTEGRATED CAT'S-EYE TUNABLE LASER SPECTROSCOPY SYSTEM AND METHOD

(71) Applicant: KineoLabs, Inc., Billerica, MA (US)

(72) Inventors: Walid A. Atia, Jamaica Plain, MA (US); Dale C. Flanders, Lexington, MA (US)

(73) Assignee: KineoLabs, Inc., Billerica, MA (US)

( * ) Notice: Subject to any disclaimer, the term of this patent is extended or adjusted under 35 U.S.C. 154(b) by 84 days.

This patent is subject to a terminal disclaimer.

(21) Appl. No.: 18/221,138

(22) Filed: Jul. 12, 2023

(65) Prior Publication Data

US 2024/0019363 A1     Jan. 18, 2024

Related U.S. Application Data

(60) Provisional application No. 63/389,505, filed on Jul. 15, 2022.

(51) Int. Cl.
*G01N 21/39* (2006.01)

(52) U.S. Cl.
CPC ... *G01N 21/39* (2013.01); *G01N 2201/06113* (2013.01); *G01N 2201/0633* (2013.01); *G01N 2201/0636* (2013.01)

(58) Field of Classification Search
CPC ......... G01N 21/39; G01N 2201/06113; G01N 2201/0633; G01N 2201/0636
See application file for complete search history.

(56) References Cited

U.S. PATENT DOCUMENTS

| | | | |
|---|---|---|---|
| 4,079,404 A | 3/1978 | Comerford et al. | |
| 5,077,747 A | 12/1991 | Hemmer et al. | |
| 5,912,910 A | 6/1999 | Sanders et al. | |
| 6,556,599 B1 * | 4/2003 | Svilans | H01S 5/141 |
| | | | 372/98 |
| 7,671,981 B1 | 3/2010 | Atia et al. | |
| 8,537,865 B1 | 9/2013 | Shou | |

(Continued)

OTHER PUBLICATIONS

International Preliminary Report on Patentability, mailed on Jan. 30, 2025, from International Application No. PCT/US2023/070043, filed on Jul. 12, 2023. 9 pages.

(Continued)

*Primary Examiner* — Jamil Ahmed
(74) *Attorney, Agent, or Firm* — HoustonHogle LLP

(57) ABSTRACT

A spectroscopy system comprises a tunable laser including a gain chip, a collimating lens for collimating light from the gain chip, an end reflector, a focusing lens for focusing the collimated light on the end reflector, a thin film bandpass filter between the collimating lens and the focusing lens, and an angle control actuator for changing the angle of the thin film filter to the collimated light. The light from the laser is coupled into a sample cell providing a sample. An amplitude detector detects light from the tunable laser prior to passing into the sample cell and a sample detector detecting light from the tunable laser after passing through the sample cell. A processor controls the angle control actuator and monitors a time response of the sample detector and the amplitude detector to resolve an absorption spectra of the sample.

18 Claims, 8 Drawing Sheets

(56) References Cited

U.S. PATENT DOCUMENTS

| | | |
|---|---|---|
| 8,823,954 B2 | 9/2014 | Xu |
| 2002/0063160 A1* | 5/2002 | Krichever .............. G06K 19/04 |
| | | 235/462.32 |
| 2004/0004979 A1 | 1/2004 | Lin |
| 2006/0203859 A1 | 9/2006 | Cable et al. |
| 2007/0071040 A1* | 3/2007 | Flanders ................... G01J 3/26 |
| | | 372/20 |
| 2007/0127539 A1 | 6/2007 | Wang et al. |
| 2008/0175280 A1 | 7/2008 | Bouma et al. |
| 2009/0059971 A1 | 3/2009 | Atia et al. |
| 2011/0080591 A1 | 4/2011 | Johnson et al. |
| 2012/0199745 A1 | 8/2012 | Flanders et al. |
| 2014/0104618 A1* | 4/2014 | Potsaid .............. G02B 27/0068 |
| | | 356/497 |
| 2014/0340585 A1 | 11/2014 | Heinzelmann et al. |
| 2016/0164255 A1 | 6/2016 | Poustie |
| 2017/0017042 A1 | 1/2017 | Menard et al. |
| 2017/0276471 A1 | 9/2017 | Jiang et al. |
| 2017/0332880 A1 | 11/2017 | Ito |
| 2017/0363415 A1 | 12/2017 | Frisken |
| 2019/0131756 A1 | 5/2019 | Tokuhisa |
| 2020/0232610 A1 | 7/2020 | Raring et al. |
| 2021/0231499 A1 | 7/2021 | Vohra et al. |
| 2022/0013978 A1 | 1/2022 | He et al. |
| 2022/0255284 A1 | 8/2022 | Xu et al. |
| 2023/0268719 A1 | 8/2023 | Mugnier |

OTHER PUBLICATIONS

Vizbaras, A. et al., "Swept-wavelength lasers based on GaSb gainchip technology for non-invasive biomedical sensing applications in the 1.7-2.5 µm wavelength range", Optical Materials Express, vol. 8, No. 10, Oct. 1, 2018. 4834-4849.

International Search Report and Written Opinion of the International Searching Authority, mailed on Oct. 27, 2023, from International Application No. PCT/US2023/070043, filed on Jul. 12, 2023. 12 pages.

Kasai, K. et al., "1.5µm, mode-hop-free full C-band wavelength tunable laser diode with a linewidth of 8 kHz and a RIN of -130 dB/Hz and its extension to the L-band", Optics Express, vol. 25, No. 18, Sep. 4, 2017, 22113-22124.

Martin, A. et al., "External cavity diode laser setup with two interference filters", Applied Physics B, vol. 122, No. 12, Dec. 2, 2016, 1-6.

Vassiliev, V.V. et al., "Vibration-proof ECDL with an Intracavity Interference Filter", Bulletin of the Lebedev Physics Institute, vol. 46, No. 10, Oct. 1, 2019, 309-313.

International Search Report and Written Opinion of the International Searching Authority, mailed on Jul. 3, 2023, from International Application No. PCT/US2023/064365, filed on Mar. 15, 2023. 11 pages.

Partial International Search Report, mailed on Jun. 28, 2023, from International Application No. PCT/US2023/064368, filed on Mar. 15, 2023. 9 pages.

International Search Report and Written Opinion of the International Searching Authority, mailed on Sep. 18, 2023, from International Application No. PCT/US2023/064368, filed on Mar. 15, 2023. 18 pages.

Anna, T. et al., "Simultaneous tomography and topography of silicon integrated circuits using full-field swept-source optical coherence tomography," Journal of Optics. A, Pure and Applied Optics, vol. 11(4), Apr. 1, 2009, 9 pages.

Beica, H.C. et al., "An Auto-Locked Diode Laser System for Precision Metrology", Laser Radar Technology and Applications XXII, Proc. of SPIE vol. 10191, May 5, 2017, 6 pages.

Bilenca, A. et al., "Numerical study of wavelength-swept semiconductor ring lasers: the role of refractive-index nonlinearities in semiconductor optical amplifiers and implications for biomedical imaging applications," Optics Letters, vol. 31, No. 6, Mar. 15, 2006, 760-762.

Delfyett, P.J. et al., "Intracavity Spectral Shaping in External Cavity Mode-Locked Semiconductor Diode Lasers", IEEE Journal of Selected Topics in Quantum Electronics, vol. 4(2), Apr. 1, 1998, 216-223.

Fechtig, D.J. et al., "Line-field parallel swept source MHz OCT for structural and functional retinal imaging," Biomedical Optics Express, vol. 6, No. 3, Mar. 1, 2015, 716-735.

Huber, R. et al., "Buffered Fourier domain mode locking: unidirectional swept laser sources for optical coherence tomography imaging at 370,000 lines/s," Optics Letters, vol. 31, No. 20, Oct. 15, 2006, 2975-2977.

Kischkat, J. et al., "Alignment-stabilized interference filter-tuned external-cavity quantum cascade laser", Optics Letters, vol. 39, No. 23, Dec. 1, 2014, 6561-6564.

Kuznetsov, M. et al., "Compact Ultrafast Reflective Fabry-Perot Tunable Lasers For OCT Imaging Applications," Optical Coherence Tomography and Coherence Domain Optical Methods in Biomedicine XIV, Proc. SPIE, 75541F, Feb. 22, 2010, 6 pages.

Lee, S-W. et al., "Line-Field Optical Coherence Tomography Using Frequency-Sweeping Source," IEEE Journal of Selected Topics in Quantum Electronics, vol. 14, No. 1, Jan. 2008, 50-55.

Leitgeb, R.A. et al., "Ultrahigh resolution Fourier domain optical coherence tomography," Optics Express, vol. 12, No. 10, May 17, 2004, 2156-2165.

Potsaid, B. et al., "Ultrahigh speed 1050nm swept source / Fourier domain OCT retinal and anterior segment imaging at 100,000 to 400,000 axial scans per second," Optics Express, vol. 18, No. 19, Sep. 3, 2010, 20029-20048.

Wang, Z. et al., "A 657-nm narrow bandwidth interference filter-stabilized diode laser", Chinese Optics Letters, vol. 9(4), Apr. 10, 2011, 2 pages.

Yun, S.H. et al., "High-speed optical frequency-domain imaging," Optics Express, vol. 11, No. 22, Nov. 3, 2003, 2953-2963.

International Preliminary Report on Patentability mailed on Sep. 26, 2024, from International Application No. PCT/US2023/064365, filed on Mar. 15, 2023. 7 pages.

International Preliminary Report on Patentability mailed on Sep. 26, 2024, from International Application No. PCT/US2023/064368, filed on Mar. 15, 2023. 13 pages.

* cited by examiner

INTEGRATED CAT'S-EYE TUNABLE LASER SPECTROSCOPY SYSTEM AND METHOD

RELATED APPLICATIONS

This application claims the benefit under 35 U.S.C. § 119(e) of U.S. Provisional Application No. 63/389,505, filed on Jul. 15, 2022, which is incorporated herein by reference in its entirety.

BACKGROUND OF THE INVENTION

Absorption spectroscopy measures the presence and/or concentration of a species of interest in a sample by passing a light beam through the sample and detecting the absorption at wavelengths of particular spectral absorption features of the species of interest. Generally, such features are absorption lines that represent the frequency of light corresponding to vibrational, rotational or electronic transitions of molecules of the gas, liquid, or solid of interest. Tunable diode lasers provide many advantages for such absorption spectroscopy measurements in that the lasers can be tuned to the center of a spectral feature and generate a narrow signal relative to the width of the spectral feature.

Laser absorption spectroscopy can thus offer high speed and relatively high precision capabilities for detecting a variety of trace species in a gas or liquid sample. Tunable diode laser spectrometers are particularly suited to high sensitivity studies, in part, because they may be frequency-modulated to reduce low frequency laser and electronic noise. In general, a laser spectrometer will include a frequency tunable laser that generates an output beam that is directed through a sample cell that contains a sample. The output beam is received by an optical detector and the signal of the optical detector is demodulated to obtain an absorption induced signal. This absorption induced signal can be used to identify one or more species of interest within the sample.

The spectral region of 1.7-2.5 micrometers (μm) contains a number of important spectral features for various sensor applications including strong overtone and combination molecular absorption bands in gas molecules such as CO, $CO_2$, $CH_4$, $NH_4$ etc, in liquid phase biomolecules such as glucose, lactate, albumin, urea, ammonia, as well as the atmospheric transmission window (2-2.3 μm) for LIDAR and remote sensing applications. See Swept-wavelength lasers based on GaSb gain-chip technology for non-invasive biomedical sensing applications in the 1.7-2.5 μm wavelength range, Vizbaras, et al., Vol. 8, No. 10, 1 Oct. 2018, OPTICAL MATERIALS EXPRESS 48.

SUMMARY OF THE INVENTION

The present invention concerns a spectroscopy system and method including tunable or swept laser architectures.

The swept laser employs a cat's-eye configuration with a preferably transmissive tilt tuned filter.

In general, according to one aspect, the invention features a spectroscopy system, comprising a tunable laser. This laser includes a gain chip, a collimating lens for collimating light from the gain chip, an end reflector, a focusing lens for focusing the collimated light on the end reflector, a thin film bandpass filter between the collimating lens and the focusing lens, and an angle control actuator for changing the angle of the thin film filter to the collimated light.

The light from the laser is coupled into a sample cell containing a sample.

An amplitude detector detects light from the tunable laser prior to passing into the sample cell and a sample detector detecting light from the tunable laser after passing through the sample cell. A processor controls the angle control actuator and monitors a time response of the sample detector and the amplitude detector to resolve an absorption spectrum of the sample.

In examples, the gain chip might be an InP chip or an GaSb chip.

Also, the angle control actuator can be a galvanometer such as a servomechanism galvanometer. Other options include a motor that continuously spins the thin film bandpass filter.

Often the thin film bandpass filter is oriented to receive an S or P polarization from the gain chip.

In operation, the processor often divides the time response of the sample detector and the amplitude detector to address laser noise.

With respect to construction, a base can be provided for holding a package containing the gain chip and angle control actuator. A frame can then be mounted on the base for holding the end reflector and the focusing lens. The frame can further hold the amplitude detector, a wavelength reference and a wavelength reference detector.

Many times in operation, the processor includes a PID (a proportional-integral-derivative) controller that compares an angle signal generated by an encoder of the angle control actuator to a specified tuning function to control an angle of the angle control actuator.

For many configurations, a beam size of the collimated light for a small axis at bandpass filter is preferably between 0.5 and 2 mm. Also there can be at least 5 to 10 or more lasing cavity modes during operation.

A passband of the bandpass filter can be between 1 and 20 nanometers (nm) full width half maximum (FWHM).

In general, according to another aspect, the invention features a spectroscopy method. The method comprises generating a tunable optical signal with a tunable laser, including a gain chip; a collimating lens for collimating light from the gain chip, an end reflector, a focusing lens for focusing the collimated light on the end reflector, a thin film bandpass filter between the collimating lens and the focusing lens, and at least one angle control actuator for changing the angle of the thin film filter to the collimated light. The tunable optical signal from the tunable laser is detected prior to passing through a sample and the tunable optical signal from the tunable laser is detected after passing through the sample. The angle control actuator is controlled while monitoring a time response of the sample detector and the amplitude detector to resolve an absorption spectra of the sample.

The above and other features of the invention including various novel details of construction and combinations of parts, and other advantages, will now be more particularly described with reference to the accompanying drawings and pointed out in the claims. It will be understood that the particular method and device embodying the invention are shown by way of illustration and not as a limitation of the invention. The principles and features of this invention may be employed in various and numerous embodiments without departing from the scope of the invention.

BRIEF DESCRIPTION OF THE DRAWINGS

In the accompanying drawings, reference characters refer to the same parts throughout the different views. The drawings are not necessarily to scale; emphasis has instead been placed upon illustrating the principles of the invention. Of the drawings.

DETAILED DESCRIPTION OF THE PREFERRED EMBODIMENTS

The invention now will be described more fully hereinafter with reference to the accompanying drawings, in which illustrative embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

As used herein, the term "and/or" includes any and all combinations of one or more of the associated listed items. Also, all conjunctions used are to be understood in the most inclusive sense possible. Thus, the word "or" should be understood as having the definition of a logical "or" rather than that of a logical "exclusive or" unless the context clearly necessitates otherwise. Further, the singular forms and the articles "a", "an" and "the" are intended to include the plural forms as well, unless expressly stated otherwise. It will be further understood that the terms: includes, comprises, including and/or comprising, when used in this specification, specify the presence of stated features, integers, steps, operations, elements, and/or components, but do not preclude the presence or addition of one or more other features, integers, steps, operations, elements, components, and/or groups thereof. Further, it will be understood that when an element, including component or subsystem, is referred to and/or shown as being connected or coupled to another element, it can be directly connected or coupled to the other element or intervening elements may be present.

It will be understood that although terms such as "first" and "second" are used herein to describe various elements, these elements should not be limited by these terms. These terms are only used to distinguish one element from another element. Thus, an element discussed below could be termed a second element, and similarly, a second element may be termed a first element without departing from the teachings of the present invention.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Figure 1A:
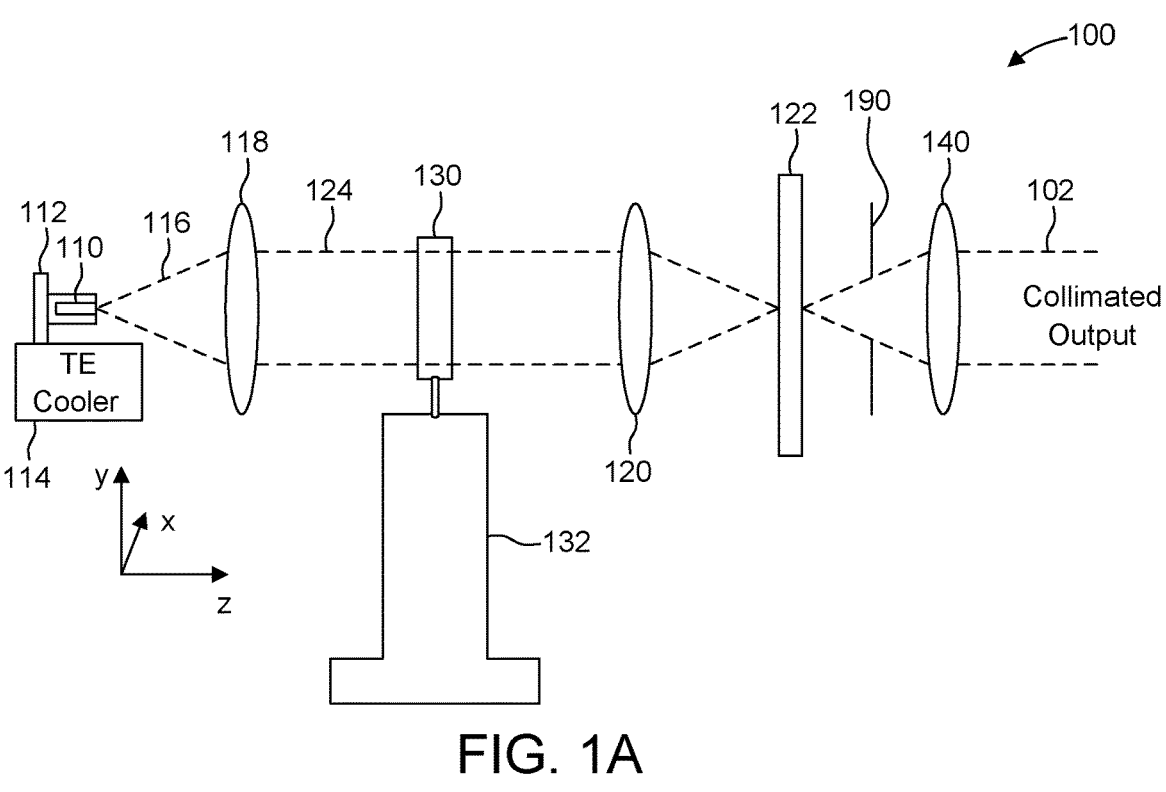
FIG. 1A is a schematic side view of a cat's-eye tunable laser and FIG. 1B is a schematic side view showing a preferred implementation of angle control actuator.

FIG. 1A shows a tunable laser 100 that is sometimes referred to as a cat's-eye laser, which is employed in examples of the present invention.

The laser's amplification is provided by a gain chip 110. In one example, the gain chip is a GaSb chip that amplifies light in the wavelength range of about 1700-2500 nanometers (nm).

Preferably its center wavelength is around 2250 nanometers and more generally between 2200 and 2300 nm.

In another example, the laser's amplification is provided by a InP gain chip 110. In one example, the gain chip amplifies light in the wavelength range of about 1500-1800 nanometers.

Preferably its center wavelength is around 1700 nanometers+/−50 nanometers or more generally +/−100 nanometers.

Other material systems can be selected for the gain chip 110, however. Common material systems are based on III-V semiconductor materials, including binary materials, such as GaN, GaAs, InP, GaSb, InAs, as well as ternary, quaternary, and pentenary alloys, such as InGaN, InAlGaN, InGaP, AlGaAs, InGaAs, GaInNAs, GaInNAsSb, AlInGaAs, InGaAsP, AlGaAsSb, AlGaInAsSb, AlAsSb, InGaSb, InAsSb, and InGaAsSb. Collectively, these material systems support operating wavelengths from about 400 nanometers (nm) to 2500 nm, including longer wavelength ranges extending into multiple micrometer wavelengths. Semiconductor quantum well, quantum cascade and quantum dot gain regions are typically used to obtain especially wide gain and spectral emission bandwidths, and support operation up to 250 μm in wavelength. Quantum well layers may be purposely strained or unstrained depending on the exact materials and the desired wavelength coverage.

In one embodiment, the gain chip 110 is mounted in a TO-can type hermetic package 112. This protects the chip 110 from dust and the ambient environment including moisture. In some examples, the TO-can package has an integrated or a separate thermoelectric cooler 114.

In a current example, the gain chip 110 is mounted in a windowed butterfly type package.

The free space beam 116 is diverging in both axes (x, y). It is collimated by a collimating lens 118 located in front of the TO-can package or within the package in the case of a butterfly type package. The resulting collimated beam 124 is received by a cat's eye focusing lens 120, which focuses the light onto a cat's eye mirror/output coupler 122. This defines the other end of the laser cavity, extending between the mirror/output coupler 122 and the back/reflective facet of the gain chip 110.

The collimated light 124 between the collimating lens 118 and the cat's eye focusing lens 120 passes through a thin film interference bandpass filter 130.

The passband for the filter 130 is preferably between 1 and 20 nanometers (nm) full width half maximum (FWHM), and more narrowly less than 15 nanometers. It can be between 1.5 and 2.5 nm, FWHM. In one design, it is 2 nm. But, in operation, linewidth narrowing (~4×) reduces this in the laser cavity for a narrower effective laser linewidth.

In the present design, the free spectral range of the tunable filter 130 is preferably greater than 200 nanometer and is preferably over 300 nm such as about 350 nm.

The Free Spectral Range (FSR) is a term used in the context of lasers, particularly in the field of optical resonators. The FSR is the spacing in frequency or wavelength between two successive resonant modes of the filter 130 and particularly the distance between the filter's passband on which the laser is lasering and the next higher and lower passbands. The free spectral range and thus the laser's frequency or wavelength tuning range preferably extends from less than 2250 nm to greater than 2350 nm for the GaSb chip. In the current design, it extends between 2100-2400 nm.

For a laser constructed with the InP gain chip 110, the desired filter for the laser has a free spectral range of about 1500-1800 nanometers.

The so-called "effective refractive index" of the tunable filter 52 is preferably greater than 1.50, and is ideally higher than 1.60, such as 1.65.

These general design parameters yield a large number of lasing cavity modes under the envelope for the filter linewidth for a laser cavity length of about 50 millimeters (mm), for example. In the preferred embodiment, there are at least 15 modes under the filter envelope and at least 5 lasing modes for linewidth narrowed to 0.5 nm. Ideally, there are at least 25 modes and possibly 37 modes or more and at least 7 lasing modes or 10 or more lasing modes for linewidth narrowed during operation.

This represents a large number of modes and will work well for low noise spectral analysis, especially when keeping in mind that the larger the number of modes, the lower the modal noise (by sqrt(number of modes). However, the amplitude referencing described herein takes out amplitude noise through common mode noise rejection either by digital division or constant power control while sweeping over the tuning range.

The bandpass filter is held on an arm of an angle control actuator 132 that changes the angle of the bandpass filter 130 to the collimated light 124. In one example, the angle control actuator is a galvanometer. In other examples, the angle control actuator 132 is a servomotor or an electrical motor that continuously spins the bandpass filter 130 in the collimated beam 124. This allows for tilting of the bandpass filter 130 with respect to the collimated beam 124 to thereby tilt-tune the filter and thus change the passband to scan or sweep the wavelength of the swept laser 100.

Tuning speed specifications for a galvanometer generally range from 0.1 Hz to 50 kHz. For the higher speeds, a 25 kHz resonant galvanometer can be used with bi-directional tuning, but higher or lower speeds can be employed as well.

The diameter of the collimated beam 124 is important for many applications. As a general rule, a smaller beam results in higher divergence resulting in a larger cone half angle (CHA) (a parameter describing the extent of the convergence or divergence of the incident beam, defined as the angle between AOI and the most oblique marginal ray). This reduces the minimum line width over angle for a tunable filter. In the current embodiment, the collimated beam is preferably not less than, i.e., greater than, 1 millimeter (mm) FWHM and is preferably greater than 2 mm FWHM. It can be smaller, however, for many spectroscopy applications in the infrared, visible or ultraviolet. In general, the CHA can be less than 0.04×0.02 degrees and preferably about 0.02× 0.01 degrees or less.

Figure 7:
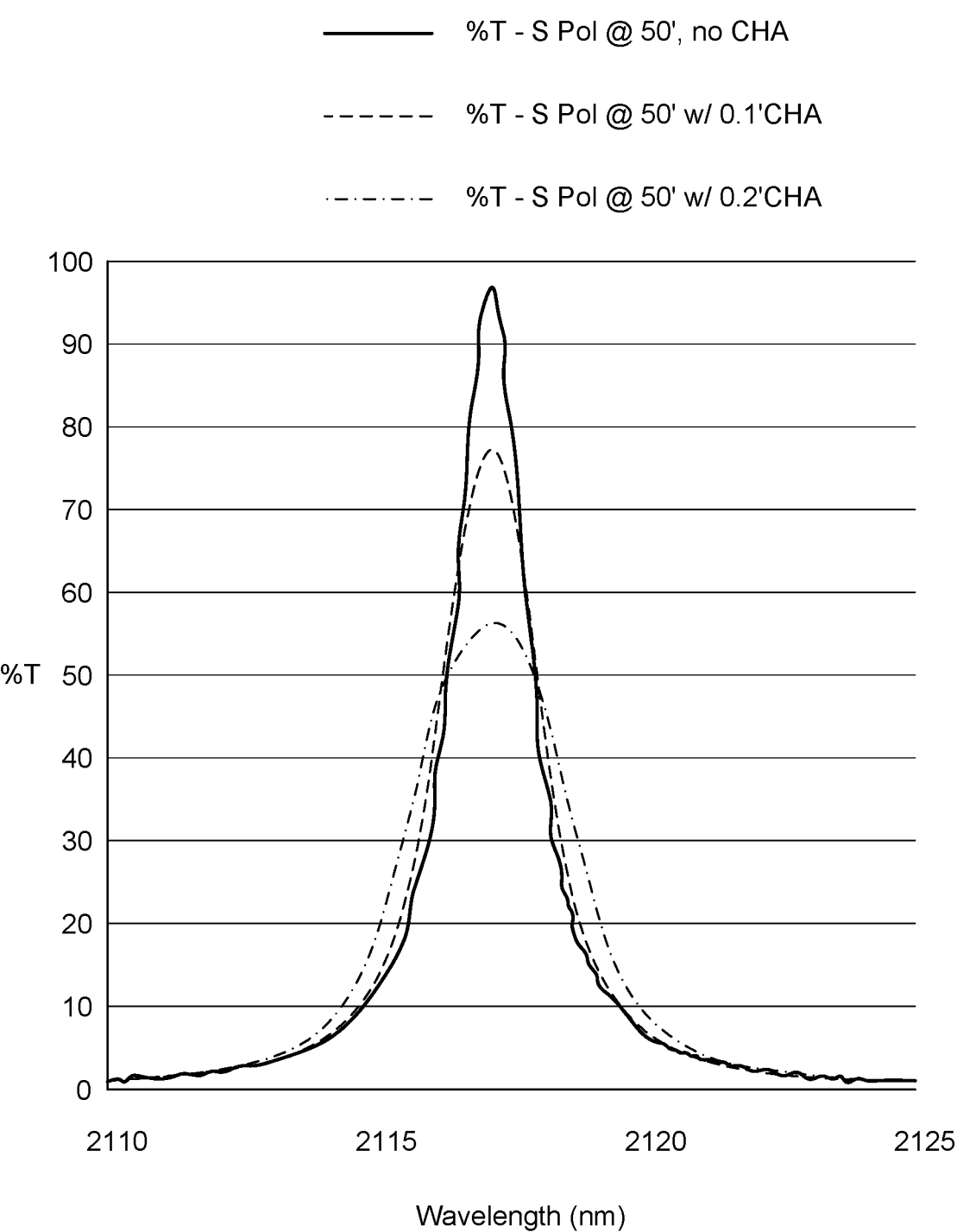
FIG. 7 is a plot of percent transmission as a function of wavelength for different values for cone half angle (CHA) for the S polarization.

FIG. 7 is a plot of percent transmission as a function of wavelength for different values for CHA for the S polarization. This illustrates the advantages of low CHA in terms of transmission and passband narrowing. For the 0° CHA (solid line) the light is collimated, while for the remaining plots show the CHA is increased from 1° to 2°. The plots demonstrate a narrow passband for CHA values.

Note that a higher divergence beam has a smaller diameter. This means collimated beams with a large enough diameter are better suited to provide the required maximum CHA, while wider beams may require physically larger tunable filters. A beam size of ~1 millimeter (mm) is typical for a CHA of 0.025 degrees, but because the beam from the chip is elliptical this value should be chosen to be the smaller axis of the beam. Moreover, the final output collimating lens 140 that forms a telescope from the cat's eye focusing lens 120 can generate an output beam of a desired diameter, with the magnification given by the ratio of the output lens focal length to the focusing lens focal length. Note that if desired the elliptical output beam is circularized with the use of anamorphic prism pairs, a pair of cylindrical lenses, or a simple spatial filter at the output, in different examples.

In any event, the beam size for the small axis (of an elliptical output) at the tunable filter is preferably between 0.5 and 2 mm. This range yields a good tradeoff between performance and tunable filter size.

The light from the gain chip is polarized. In the common architectures, the polarization is horizontal or parallel to the epitaxial layers of the edge-emitting gain chip 110. For spectroscopy, P polarization configurations might be desirable due to the higher powers across the scan band. In the preferred configuration, the filter is oriented to receive the S polarization in order to maintain a narrow line width of the filter as it is tilt-tuned. On the other hand, the P polarization broadens drastically at large tilt angles. S polarization has higher loss at larger tilt angles than P polarization. In many embodiments, the filter design addresses these issues by providing a low enough loss across the tuning band for the S polarization.

In general, the present cat's-eye configuration provides a number of advantages. It provides low loss, low tolerance, repeatable stable operation since it provides for a lower angle wavelength change over grating-based lasers.

The mirror/output coupler 122 will typically reflect about 80% of the light back into the laser's cavity and transmit about 20% of light. More generally, the mirror/output coupler can reflect from 10% to 99% of light (transmitting 90% to 1%, respectively), depending on the output power and laser cavity loss desired. Higher reflectivity results in lower loss cavities and thus wider laser tuning range where gain exceeds loss, but results in lower output power. In typical operation, the mirror/output coupler 122 reflects less than 90%.

In some embodiments, an iris or mask 190 is added typically after the mirror output coupler 122 to clip the beam edge. This reduces power fluctuations as the beam wanders due to refraction in the tilting bandpass filter 130. Preferably, it is between 80% and 95% and preferably about 90% of the beam size.

Typically, the diverging beam from the mirror output coupler 122 is typically collimated with an output collimating lens 140 to form a free space output beam 102.

Figure 1B:
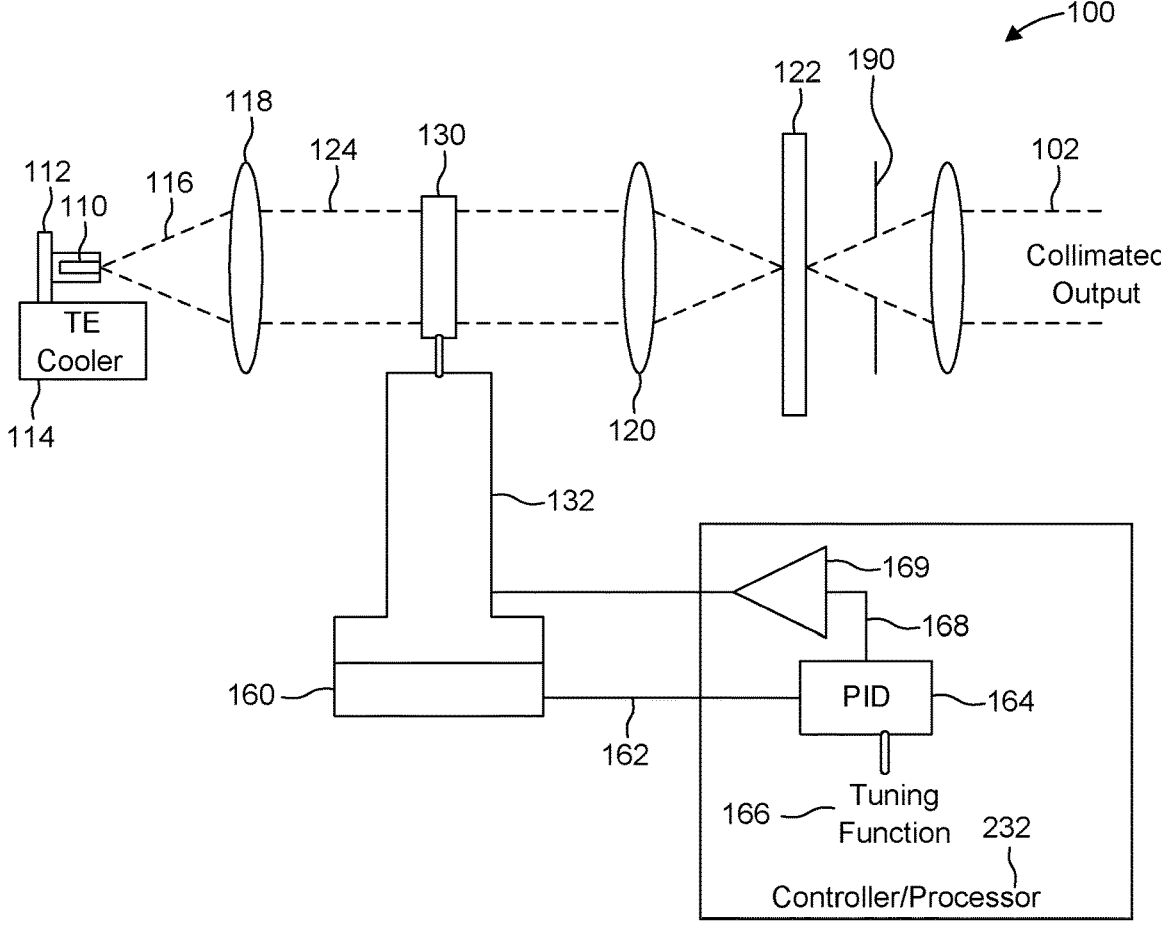

FIG. 1B shows a preferred implementation of the tunable laser 100 and specifically the angle control actuator 132.

The angle control actuator 132 is preferably operated as a servomechanism. In the illustrated embodiment, the angle control actuator 132 is a servo-controlled galvanometer. An encoder 160 produces an angle signal 162 indicating the angle of the galvanometer, and thus the filter 130, to the collimated beam 124. Preferably, the encoder is an optical encoder and is often analog.

A controller/processor 232 receives the angle signal 162 at a PID (proportional-integral-derivative) controller 164. The PID controller 164 compares the angle signal 162 to a specified tuning function 166. Often this tuning function is sawtooth or triangular waveform that is stored algorithmically or in a look up table. This yields feedback control system that corrects for any error in the position. The desired position dictated by the tuning function 166 is compared with the actual position angle control actuator 132 to produce an error signal 168, which is then fed back to the galvanometer motor via an amplifier 169 to adjust the current and bring the filter 130 to the desired position.

Figure 2A:
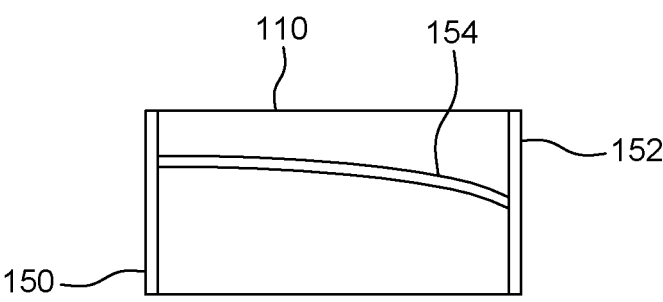
FIGS. 2A, 2B, and 2C are schematic top views of gain chips for the tunable lasers.

FIG. 2A shows a preferred gain chip architecture. This chip 110 is termed a single angled facet (SAF) edge-emitting chip. As such, it has a high reflectivity (HR) coated rear facet 150. It has an antireflective (AR) coated front facet 152. In addition, for improved performance, it has a curved ridge waveguide 154 that is perpendicular to the rear facet 150 but is angled at the interface with the front facet 152. This angling at the front facet along with the AR coating reduces reflections at the front facet reflectivity by up to 40 dB and significantly improves laser performance by reducing parasitic reflections that can otherwise lead to non-smooth tuning and mode-hopping.

Figure 2B:
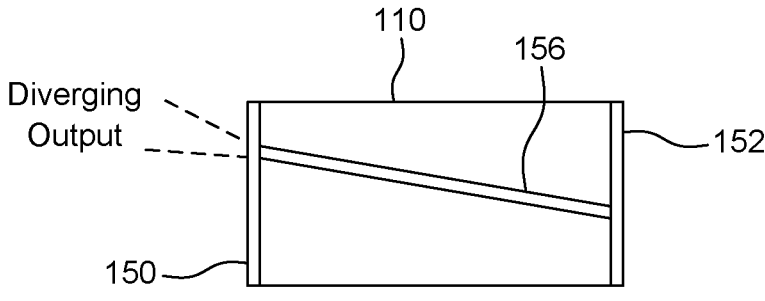

FIG. 2B shows another potential edge emitting gain chip configuration. The basic configuration is termed a semiconductor optical amplifier (SOA) gain chip. As such, it has an AR coated rear facet 150 and an AR coated front facet 152. Its straight but angled ridge waveguide 156 intersects with the facets at an angle to minimize reflections back into the chip. In one example, the back facet light of the SOA chip is coupled to a lens or pair of lenses and a mirror which reflects light to return it through the lens and to the chip. The mirror could be made partially reflecting to take the output out from the back facet.

Figure 2C:
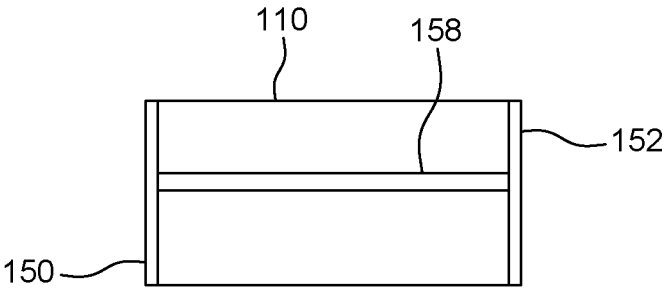

FIG. 2C shows another potential configuration of the gain chip 110. The basic configuration is termed a Fabry-Perot gain chip. As such, it has an HR coated rear facet 150 and an AR coated front facet 152. The straight ridge waveguide 158 intersects with the front facet 152 at a perpendicular angle and thus does create some internal reflections that can affect performance.

Figure 3:
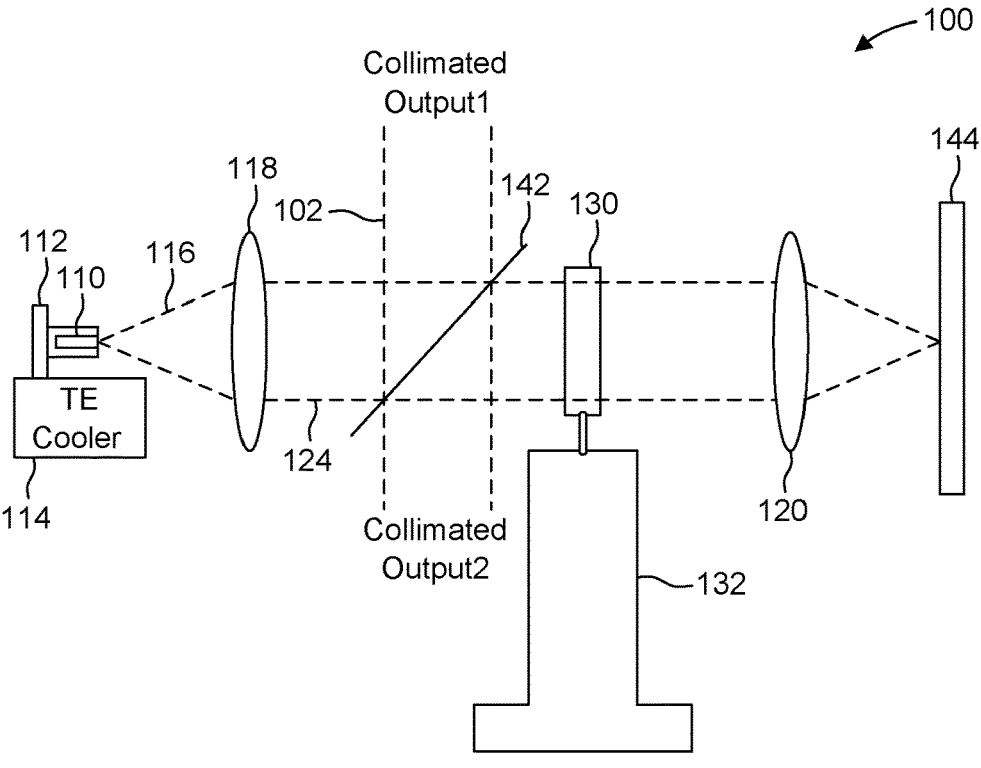
FIG. 3 is a schematic side view of a cat's-eye tunable laser according to a second embodiment.

FIG. 3 shows another example of the laser 100. Here the one or more outputs are taken within the laser's cavity. Specifically, an angled beam splitter 142 picks off part of the light in the laser's cavity as collimated output beams output1 and output2. The end mirror 144 has typically high reflectivity, such as higher than 99%, unless it is used to provide a third output.

As discussed, the output coupler is often implemented as a beam splitter. The output coupling is then chosen by selecting an output coupler with the desired ratio of reflectivity versus transmissivity. Another option is to use the combination of a polarization beam splitter and a quarter waveplate. This allows for adjustability in the output coupling by controlling the angle of the quarter waveplate.

In this configuration, show in FIG. 3, there are actually two outputs: collimated output1 and collimated output2. Generally, collimated output1 will provide higher power since it receives light directly from the chip. This output is also characterized by a higher amplified spontaneous emission (ASE) spectra. On the other hand, collimated output2 will exhibit a lower higher power, but this output is characterized by a lower spectral sideband since it takes light after double passing through the bandpass filter. Note also that in this configuration the output light's position does not deviate while the filter angle is tuned because the light is reflected back through the filter and retraces itself.

Figure 4:
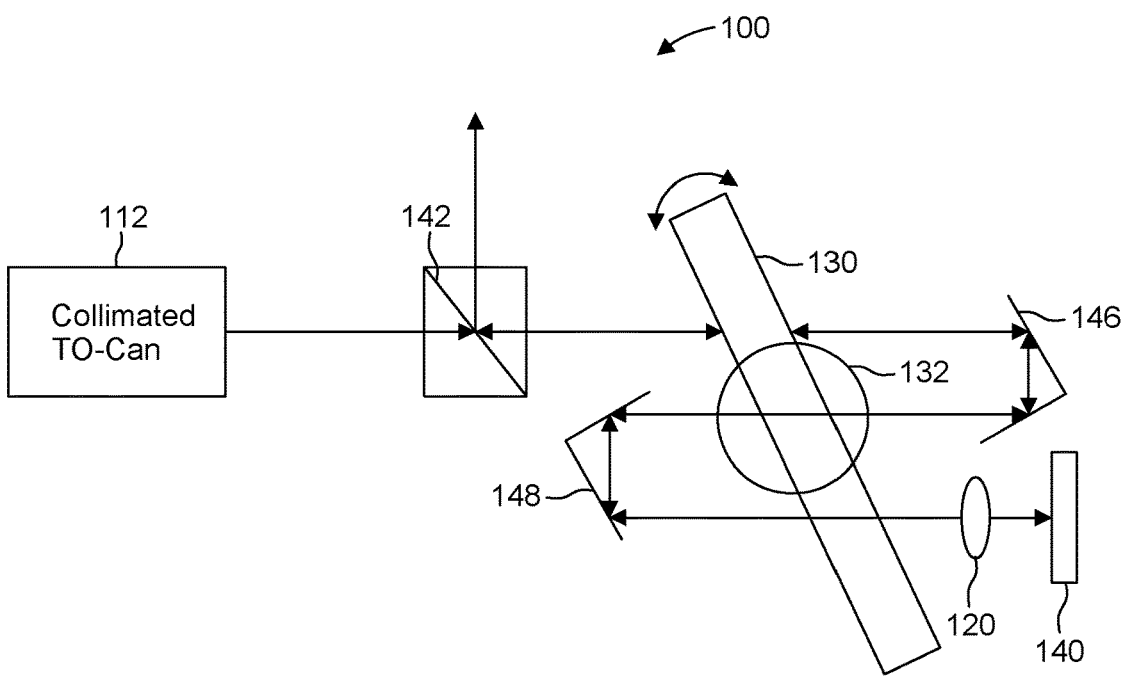
FIG. 4 is a schematic side view of a cat's-eye tunable laser according to a third embodiment.

FIG. 4 shows another embodiment of the swept laser. This version provides for a narrowed linewidth for the bandpass filter 130, which is rotated in the plane of the image in the drawing by the rotary actuator 132. Specifically, the light from the TO-can 112 is collimated by an internal lens.

The narrowed linewidth is achieved with a 6-pass arrangement. Specifically, two retroreflectors 146, 148 extend the cavity to include six passes through the bandpass filter pass for each pass through the laser's cavity. In the example shown, an intracavity output coupler 142 is used. But in other examples, a cat's eye mirror/output coupler is used. Other cases include a 4-pass arrangement with cat's eye reflector placed on the same side as the input beam to the bandpass filter.

Figure 5A:
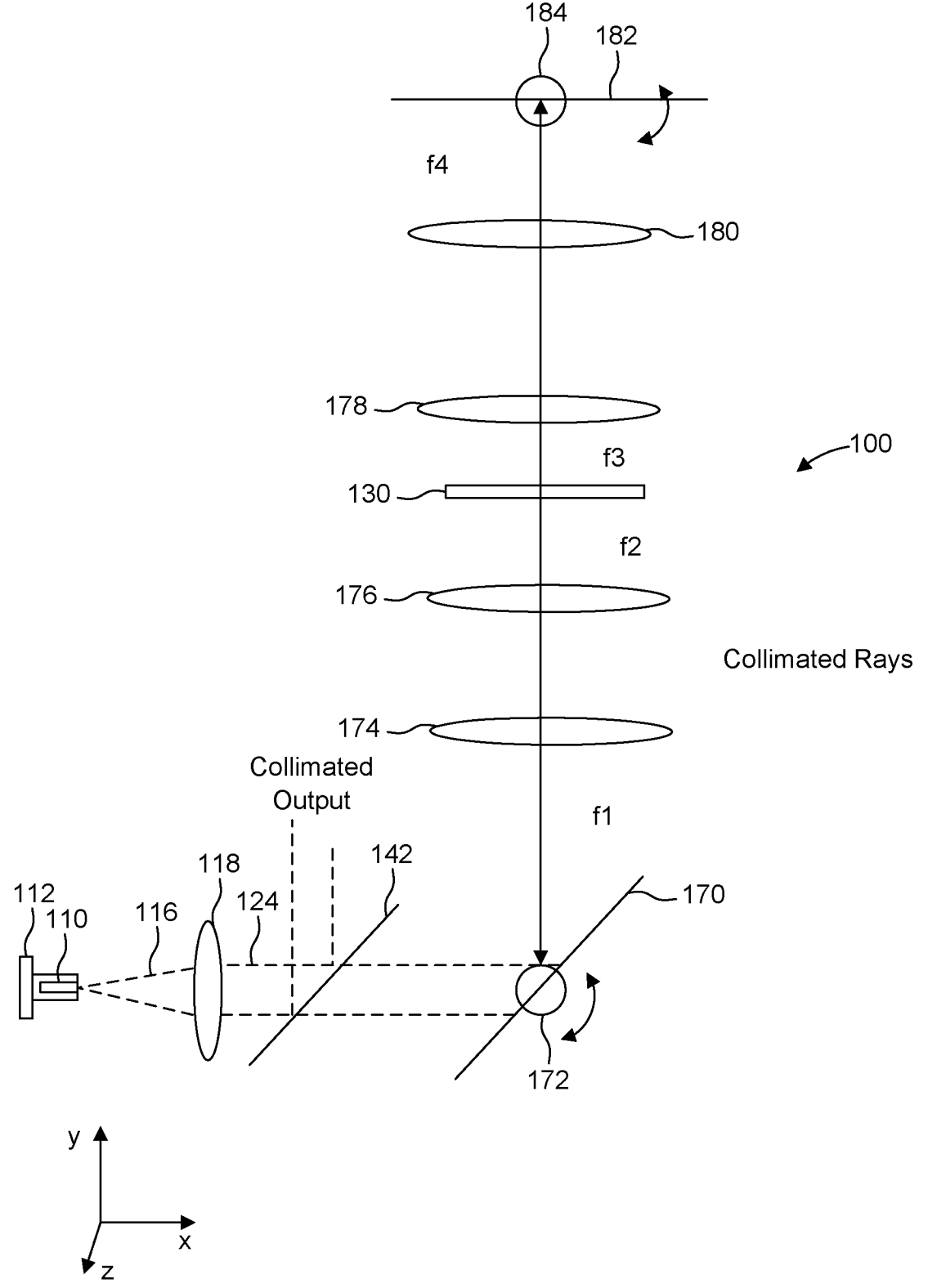
FIG. 5A-5C are schematic side views of a cat's-eye tunable laser according to a fourth embodiment.

FIG. 5A shows another cat's-eye swept or tunable laser embodiment.

The free space beam 116 from the package 112 is collimated by a collimating lens 118. It passes through an optional output coupler beam splitter 142. The resulting collimated beam reflected by a first tilt mirror 170. A first galvanometer 172 controls its tilt angle, which is in the plane of the drawing.

The light is then received by first mirror collection lens 174 that is separated from the first mirror by its focal length f1. A filter focusing lens 176 directs the light through the bandpass filter 130, which is fixed in this example. The filter focusing lens 176 is separated from the bandpass filter 130 by its focal length f2. A filter collection lens 178 collimates the light from the bandpass filter, which is also separated from the bandpass filter 130 by its focal length f3. Then a cat's eye focusing lens 180 focuses the light onto a cat's eye mirror and possible output coupler 182. This cat's eye tilt mirror 182 is held on a second galvanometer 184. The cat's eye focusing lens 180 is separated from the cat's eye tilt mirror 182 by its focal length f4.

Figure 5B:
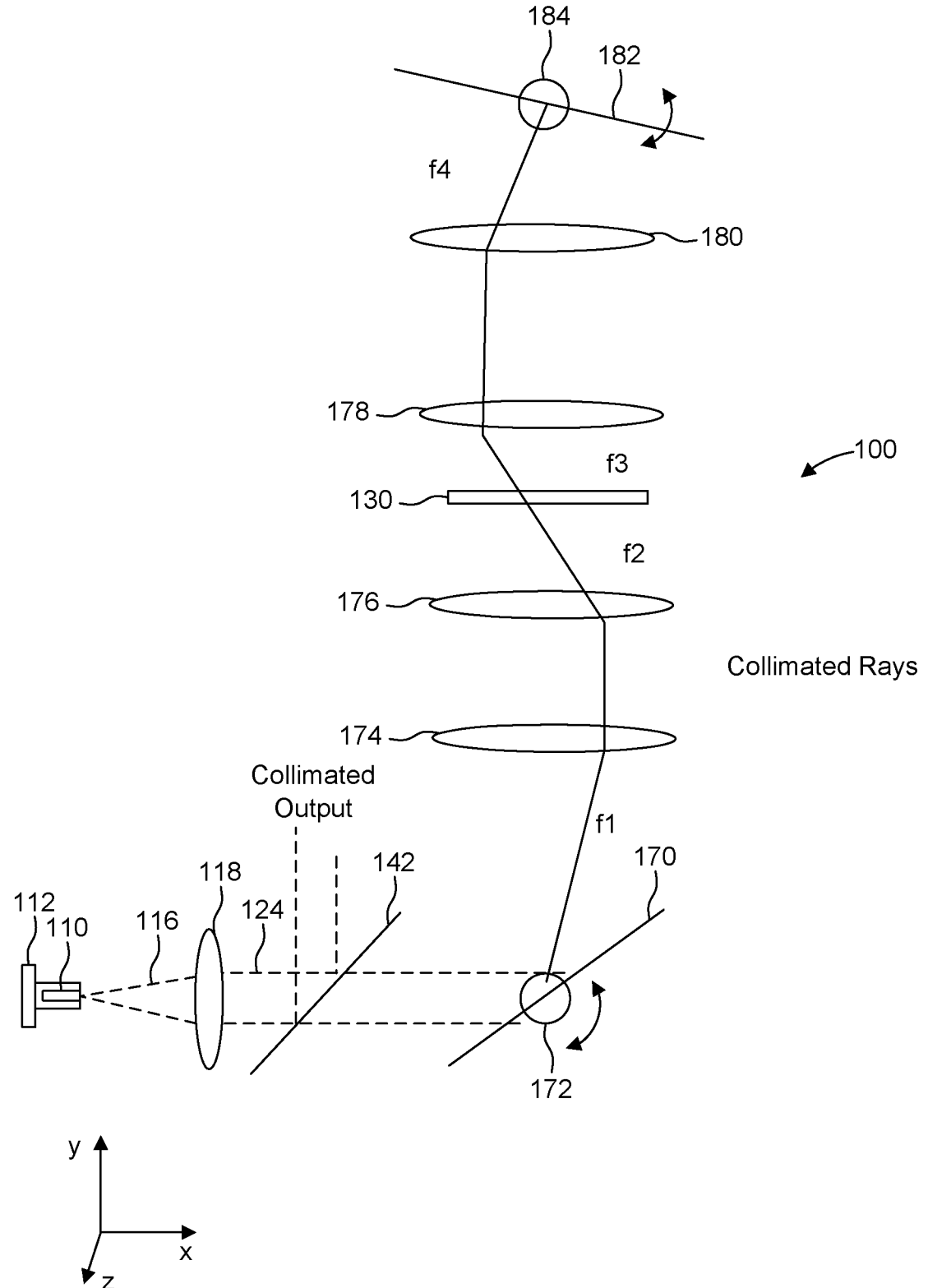

FIG. 5B shows the tunable laser embodiment tuning to a different wavelength. The first and second galvanometers are driven synchronously so that the ray retraces its path. The ray passes through the bandpass filter at an angle to thereby achieve tilt tuning without moving the bandpass filter.

Figure 5C:
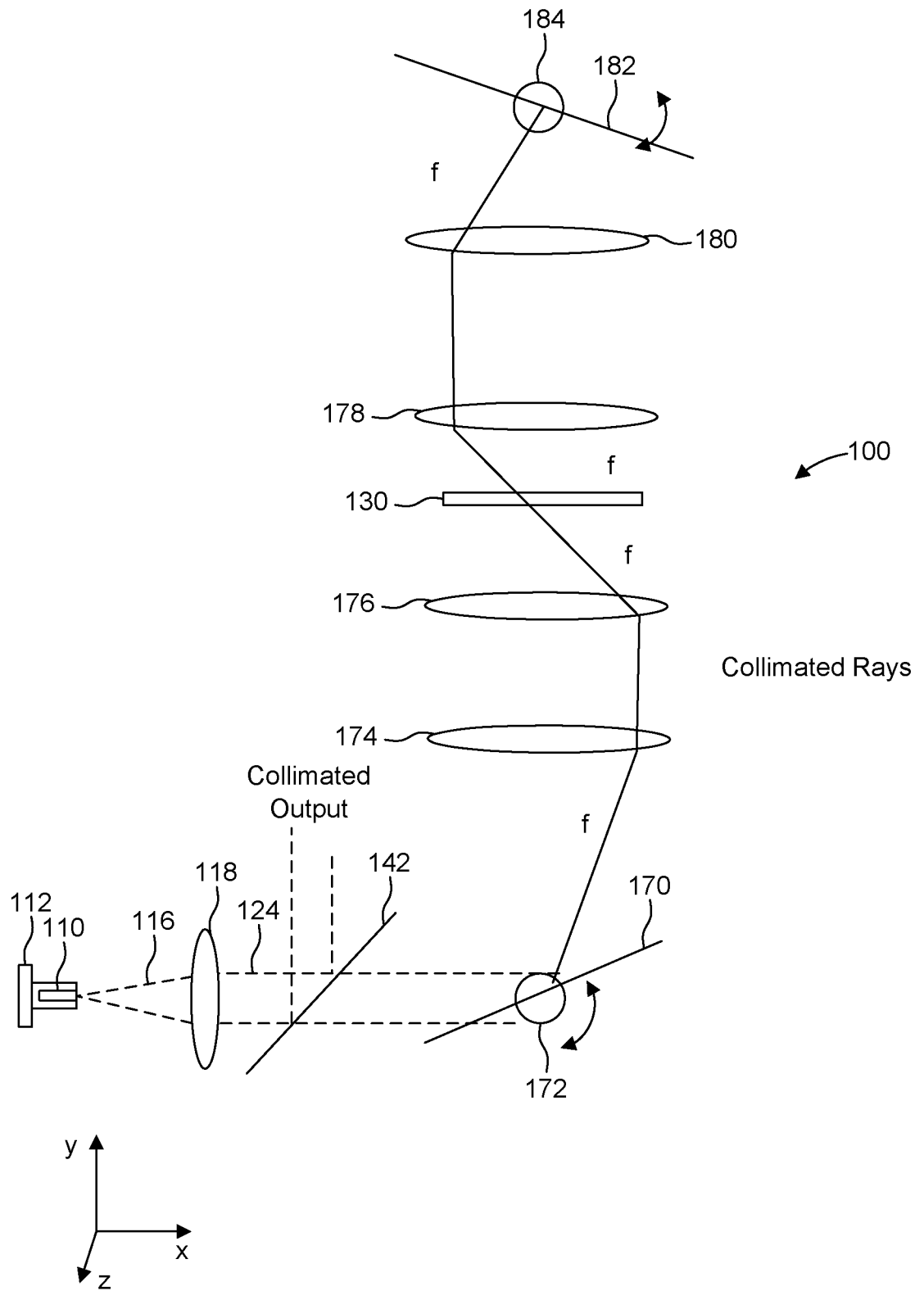

FIG. 5C shows the tunable laser embodiment tuning to still different wavelengths. The first and second galvanometers are again driven synchronously so that the ray retraces its path. The ray passes through the bandpass filter at an even higher angle to thereby achieve further tilt tuning without moving the bandpass filter 130.

The collimated light between the collimating lens and the cat's eye focusing lens FIG. 6A is a plot of transmission as a function of frequency for the passband filter at a specified angle. It shows the narrow passband.

Figure 6:
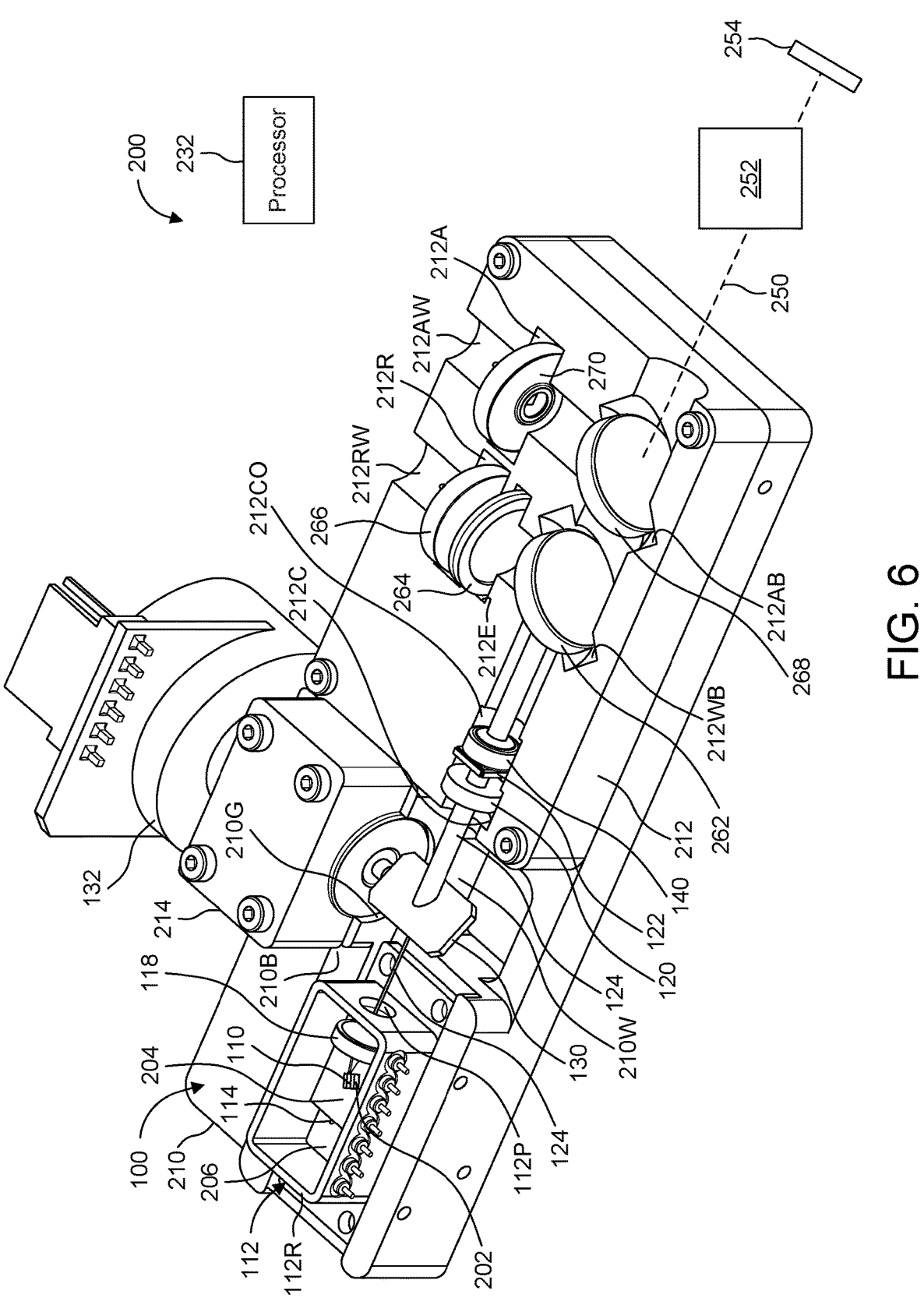
FIG. 6 is a perspective view of a tunable laser spectroscopy system with a cat's-eye swept or tunable laser.

FIG. 6 is a perspective view of a tunable laser spectroscopy system 200 with a cat's-eye swept or tunable laser 100, which has been constructed according to the principles of the present invention.

Gain chip 110 in this example is mounted on a submount 202, which is turn mounted to a bench 204. The thermoelectric cooler 114 is sandwiched between the bench 204 and a floor 206 of the butterfly package 112. The collimating lens 118 is preferably bonded to the bench 204.

The package 112 includes a front free space port 112P. The light generated by the gain chip 110 is collimated by the collimating lens 118 to pass through the front free space port 112P. Preferably a window is provided for this port 112P to enable hermetic environment of the chip 110 and its thermo electric cooler 114. In addition, typically, a lid is secured to the top rim 112R of the package 112 to complete hermetic sealing.

The beam then propagates to the filter 130. The cats-eye focusing lens 120 focuses the beam onto the cats-eye mirror/output coupler 122.

The beam passing through the output coupler 122 is received by a wavelength reference beamsplitter 262. This reflects a portion of the beam, such as a few percent to an etalon or other wavelength reference 264. The transmitted light is then detected by a wavelength reference detector 266.

The light not reflected by the wavelength reference beam splitter 262 passes to a second beam splitter, amplitude reference beamsplitter 268. This reflects a portion of the beam, again a few percent usually, to an amplitude reference detector 270.

The system is supported on a base 210, which has a butterfly slot 210B for receiving the butterfly package.

The base 210 also has a mirror well 210W and a galvanometer cradle 210G.

An optics frame 212 is mounted to the base 210. For holding the various components, it has a series of cradles or V-groove optical element mounting locations formed into the top surface of the frame 212. These include cats-eye focusing lens v-groove cradle 212C, collimating output lens cradle 212CO. wavelength reference beamsplitter cradle 212WB, amplitude reference beamsplitter cradle 212AB, etalon cradle 212E, reference detector cradle 212R, amplitude detector cradle 212A, reference wire port 212RW, amplitude wire port 212AW.

Finally, galvanometer clamp 214 secures the galvanometer to the base 110.

In typical operation, the spectrometer 200 produces a free space beam 250 from the cat's-eye swept laser 100 that illuminates a sample, such as a gas or liquid in a sample cell 252. The light transmitted through the fluid from the sample cell 252 is detected by sample detector 254.

The processor 232 controls the sweeping of the tunable laser and particular a servo galvanometer 132 or other angle control actuator through the laser's tuning range as dictated by the stored tuning function 166. Preferably, the tuning range is 20 nm or more. More than 60 nm or more than 70 nm is typically preferred. In general, the tuning range should be between 50 nm and 300 nm or more. At the same time, the processor 232 monitors the time response of the sample detector 254 along with the amplitude reference detector 270 and the wavelength reference detector 266 to thereby resolve the absorption spectra of the sample in the sample cell 252. The processor 232 will typically divide the response of the sample detector 254 by the response of the amplitude reference detector 270 to remove any laser noise such as relative intensity noise (RIN).

While this invention has been particularly shown and described with references to preferred embodiments thereof, it will be understood by those skilled in the art that various changes in form and details may be made therein without departing from the scope of the invention encompassed by the appended claims.

What is claimed is:

1. A spectroscopy system, comprising:
a tunable laser including a laser cavity, including a gain chip for providing gain in the laser cavity, a collimating lens for collimating light from the gain chip, an end reflector of the laser cavity, a focusing lens for focusing the collimated light on the end reflector, a thin film bandpass filter in the laser cavity between the collimating lens and the focusing lens, and an angle control actuator for changing the angle of the thin film bandpass filter to the collimated light to sweep a wavelength of the tunable laser;
a sample cell providing a sample;
an amplitude detector for detecting light from the tunable laser prior to passing through the sample cell;

a sample detector for detecting light from the tunable laser after passing through the sample cell; and
a processor that controls the angle control actuator and monitors a time response of the sample detector and the amplitude detector to resolve an absorption spectra of the sample.

2. The system of claim 1, wherein the gain chip is an InP chip.

3. The system of claim 1, wherein the gain chip is an GaSb chip.

4. The system of claim 1, wherein the angle control actuator is a galvanometer.

5. The system of claim 1, wherein the angle control actuator is a servomechanism.

6. The system of claim 1, wherein the angle control actuator is a motor that continuously spins the thin film bandpass filter.

7. The system of claim 1, wherein the thin film bandpass filter is oriented to receive an S polarization from the gain chip.

8. The system of claim 1, wherein the thin film bandpass filter is oriented to receive an P polarization from the gain chip.

9. The system of claim 1, wherein the processor divides the time response of the sample detector and the amplitude detector to address laser noise.

10. The system of claim 1, further comprising a base for holding a package containing the gain chip and angle control actuator.

11. The system of claim 10, further comprising a frame mounted on the base for holding the end reflector and the focusing lens.

12. The system of claim 11, wherein the frame further holds the amplitude detector, a wavelength reference and a wavelength reference detector.

13. The system of claim 1, wherein the processor includes a PID controller that compares an angle signal generated by an encoder of the angle control actuator to a specified tuning function to control an angle of the angle control actuator.

14. The system of claim 1, wherein a beam size of the collimated light for a small axis at bandpass filter is between 0.5 and 2 mm.

15. The system of claim 1, wherein at least 5 cavity modes simultaneously lase.

16. The system of claim 1, wherein at least 10 cavity modes simultaneously lase.

17. The system of claim 1, wherein a passband of the thin film bandpass filter is between 1 and 20 nanometers (nm) full width half maximum (FWHM).

18. A spectroscopy method, comprising:
generating a tunable optical signal with a tunable laser, including a gain chip providing gain to a laser cavity; a collimating lens for collimating light from the gain chip, an end reflector of the laser cavity, a focusing lens for focusing the collimated light on the end reflector, a thin film bandpass filter in the laser cavity between the collimating lens and the focusing lens, and at least one angle control actuator for changing the angle of the thin film bandpass filter to the collimated light to sweep a wavelength of the tunable laser;
detecting the tunable optical signal from the tunable laser prior to passing through a sample;
detecting the tunable optical signal from the tunable laser after passing through the sample; and controlling the angle control actuator and monitoring a time response of the sample detector and the amplitude detector to resolve an absorption spectra of the sample.

\* \* \* \* \*